June 10, 1947.  P. L. THURSTON ET AL  2,421,817
SEAMLESS HOSIERY
Original Filed June 2, 1944  10 Sheets-Sheet 3

INVENTORS
PAUL L. THURSTON,
HARRISON F. HILKER
AND HAROLD WELKER
BY
ATTORNEY.

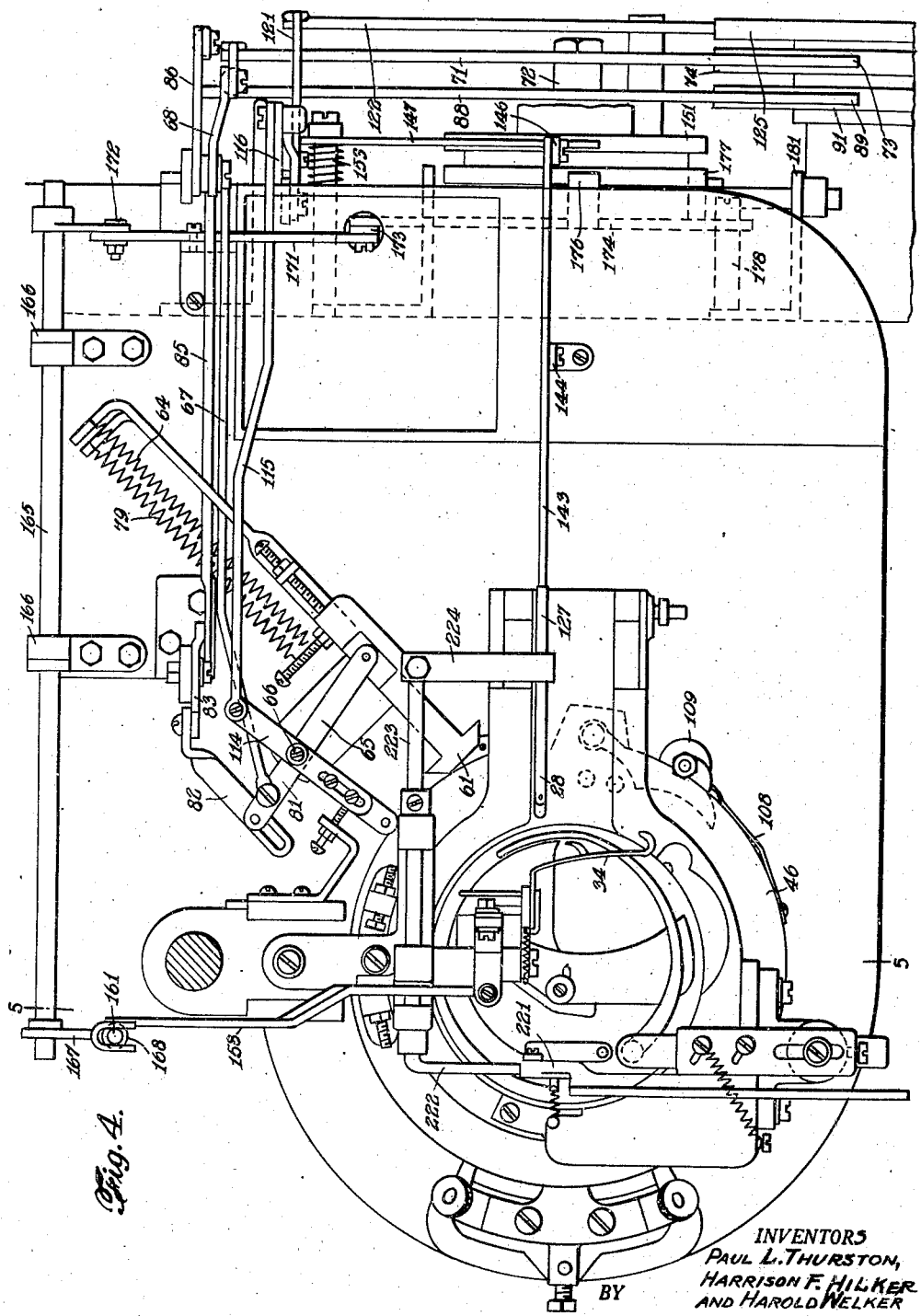

June 10, 1947. P. L. THURSTON ET AL 2,421,817
SEAMLESS HOSIERY
Original Filed June 2, 1944 10 Sheets-Sheet 5
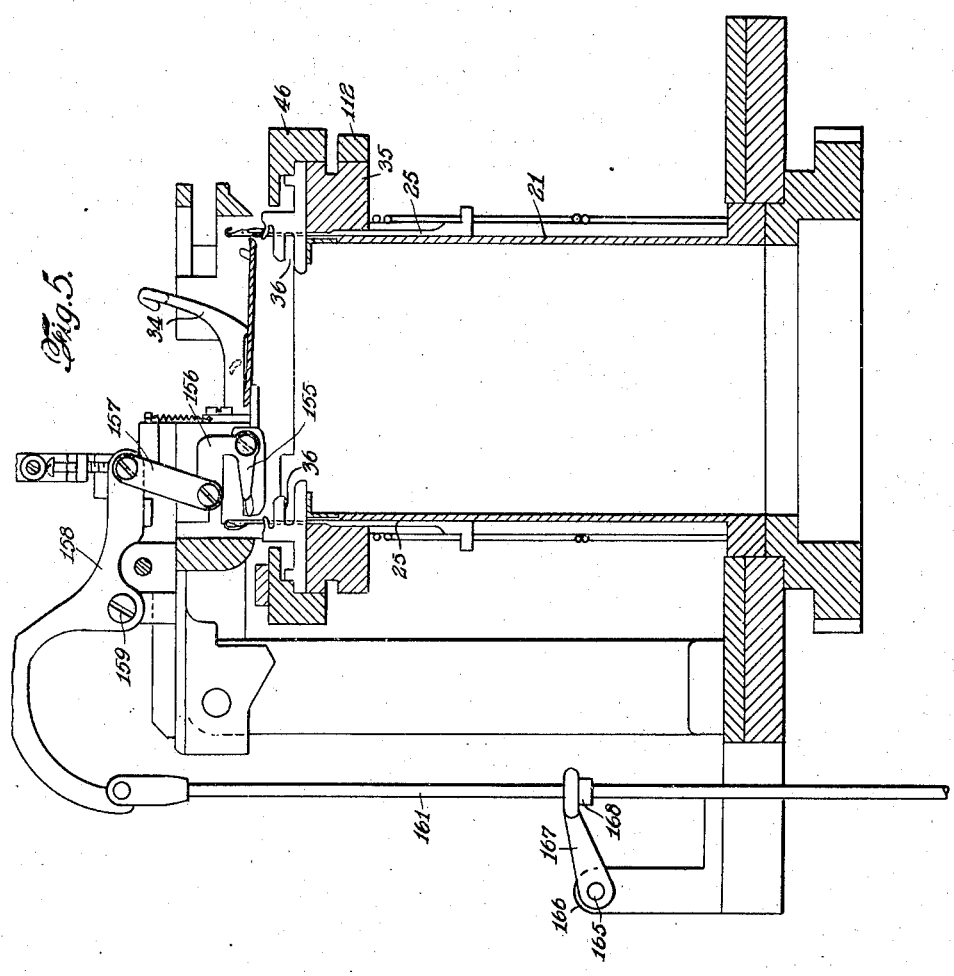
INVENTORS
PAUL L. THURSTON,
HARRISON F. HILKER
AND HAROLD WELKER
BY
Robert E. Burns
ATTORNEY.

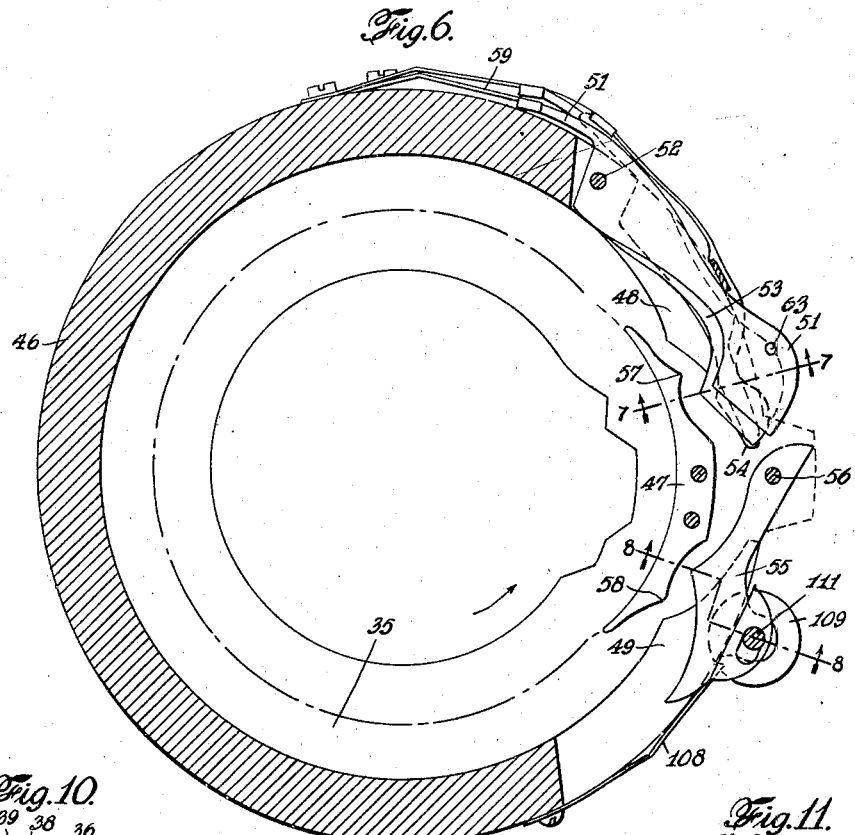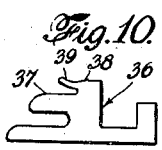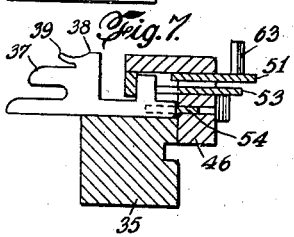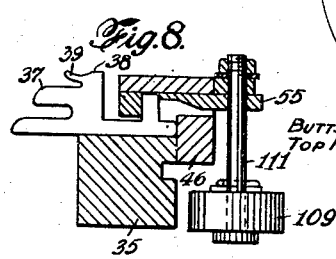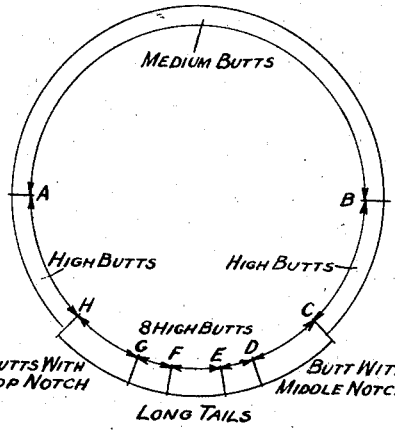

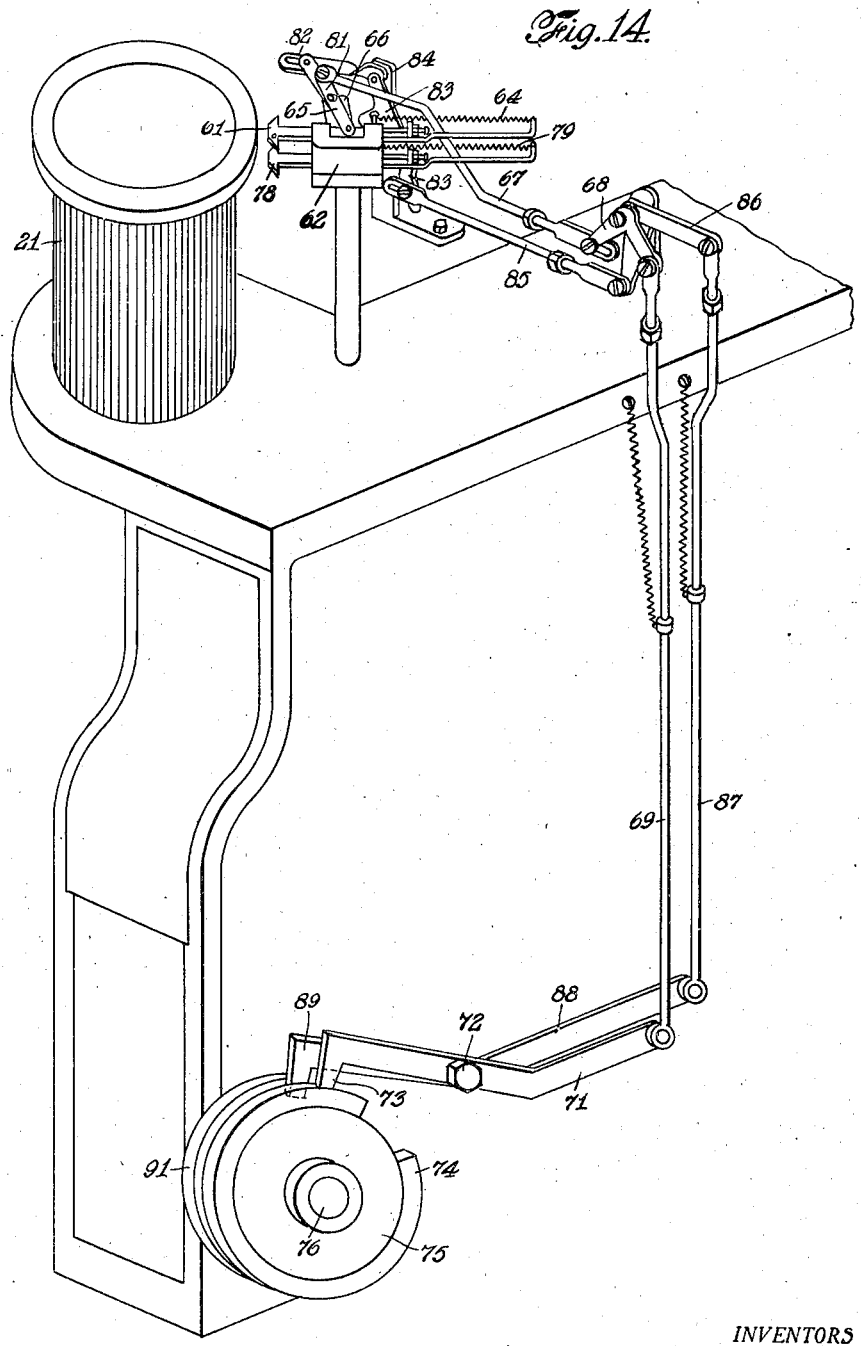

June 10, 1947.    P. L. THURSTON ET AL    2,421,817
SEAMLESS HOSIERY
Original Filed June 2, 1944    10 Sheets-Sheet 8
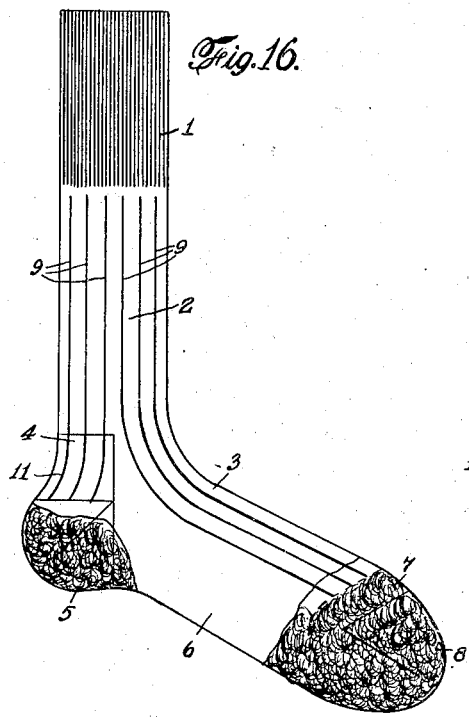
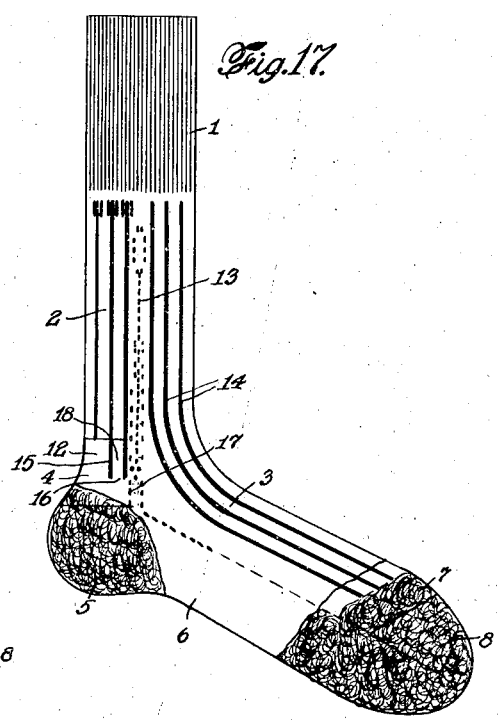
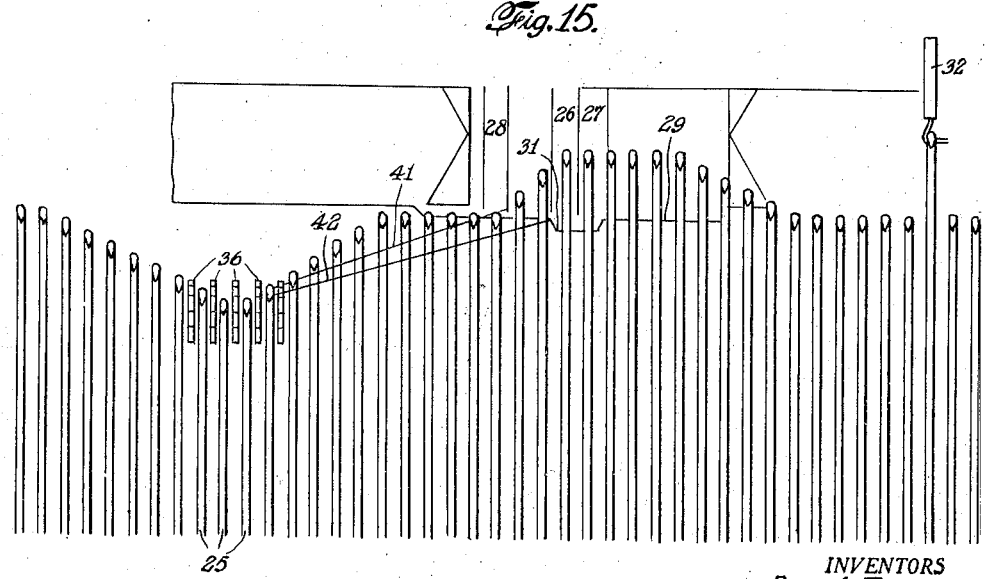
INVENTORS
PAUL L. THURSTON,
HARRISON F. HILKER
BY   AND HAROLD WELKER
*Robert E. Burns*
ATTORNEY

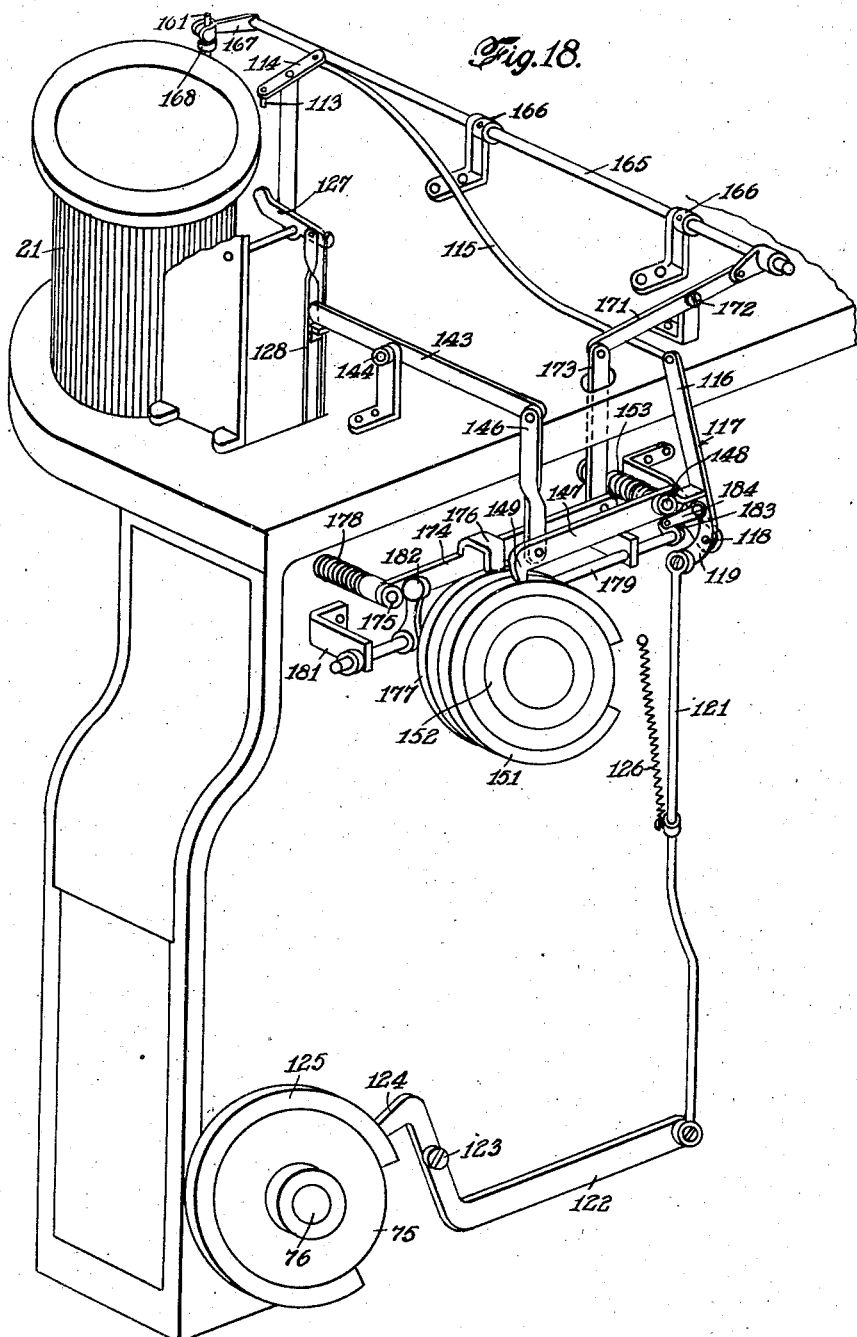

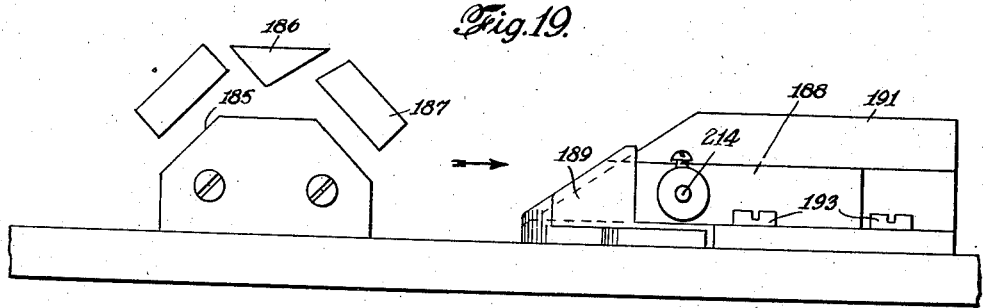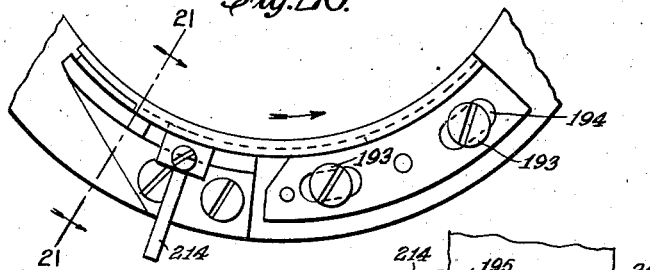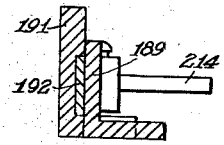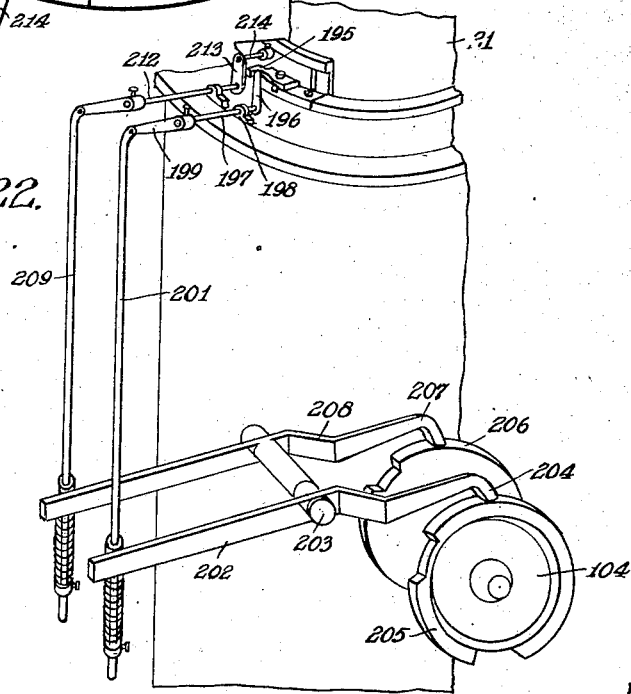

Patented June 10, 1947

2,421,817

UNITED STATES PATENT OFFICE 2,421,817

SEAMLESS HOSIERY

Paul L. Thurston, Harrison F. Hilker, and Harold Welker, Martinsburg, W. Va., assignors to Interwoven Stocking Company, New Brunswick, N. J., a corporation of New Jersey Original application June 2, 1944, Serial No. 538,422. Divided and this application January 3, 1945, Serial No. 571,154

13 Claims. (Cl. 66—180)

The present invention relates to articles of hosiery, and is a division of our former application, filed on or about June 2, 1944 and given Serial No. 538,422.

In knitting hosiery on a circular knitting machine it has heretofore been proposed to make at least certain portions of the article of terry fabric by feeding body thread and terry thread to the needles and drawing longer loops of the terry thread than of the body thread to provide terry loops at one face of the fabric. This has been done, for example, by providing the knitting machine with sinkers having upper and lower levels, and feeding the terry thread below the upper level but above the lower level of the sinkers, so that loops of the terry thread are drawn over the upper level, while stitches of the body thread are drawn over the lower level of the sinkers.

It has also been proposed to produce articles of hosiery having a decorative wrap embroidery pattern by feeding wrap thread to selected needles and knitting the wrap thread in plated relation with the body thread, so that the wrap thread appears on the outside of the fabric at selected wales to provide the desired design.

However, it has not heretofore been possible to produce articles of hosiery combining the advantages of the soft cushioned effect of terry fabric and the ornamental effect of wrap embroidery designs, serious obstacles having prevented the attainment of such combinations. Terry fabric has heretofore been produced on machines which, apart from the complications introduced to form the terry loops were of relatively simple construction. Machines for producing wrap embroidery designs, on the other hand, are relatively complex, requiring a special rotary head carrying a multiplicity of tubes or guides for feeding separate embroidery threads to a plurality of selected needles, a horn for controlling the threads during rotation of the needle cylinder, patterning mechanism to provide a predetermined and usually varying needle selection, and means for manipulating the needles and sinkers of the knitting machine in a particular way to produce the desired design. The production of terry fabric requires different manipulation of the needles and sinkers, special sinkers or other instrumentalities for forming the terry loops and special means for feeding the terry thread and body thread to secure proper separation of the threads. The respective complexities of the mechanism for producing wrap embroidery fabric and mechanism for producing terry fabric are thus mutually incompatible and the provision of a single machine that would produce an article of hosiery combining both terry fabric and a wrap embroidery design has presented a difficult problem which has heretofore remained unsolved.

Moreover, articles of hosiery embodying wrap embroidery patterns are usually designed for high quality trade and are knit on fine gauge machines, having, for example, twenty or more needles per inch in the needle cylinder. The formation of satisfactory terry fabric on a fine gauge machine presents particular difficulties because of the close clearances and close tolerances in the machine, the more precise timing required and the weakness of the fine yarns used in fine gauge fabric. The difficulties are further increased when knitting by reciprocation of the needle cylinder, as in making the heel and toe portions of the article.

It is an object of our invention to overcome these difficulties of the prior art and to provide an article of hosiery formed of fine gauge fabric having portions formed with terry loops. By fine gauge fabric is meant fabric knit on a machine having 20 or more needles per inch and using thread not coarser than 250 denier in nylon or rayon or equivalent sizes of other yarns. A further object of our invention is to provide an article of hosiery having both the advantageous characteristics of terry fabric and the desirable appearance provided by a wrap embroidery design. Another object of our invention is to provide an article of hosiery having leg and instep portions formed of wrap embroidery fabric, and a buffer heel portion of terry fabric extending above the usual heel or high splice portion, and of less width in a coursewise direction than the highsplice or heel.

Other objects, advantages and characteristics of our invention will appear from the following description and the appended claims, in conjunction with the accompanying drawings, which show by way of example, two articles of hosiery selected to illustrate our invention, and a knitting machine selected to illustrate the knitting of such articles.

In the drawings,

Fig. 4 is a partial plan view of the machine.

Fig. 5 is a vertical sectional view taken approximately on the line 5—5 of Fig. 4.

Fig. 6 is an enlarged horizontal sectional view through the sinker cap of the knitting machine taken approximately on the line 6—6 of Fig. 5.

Figure 1:
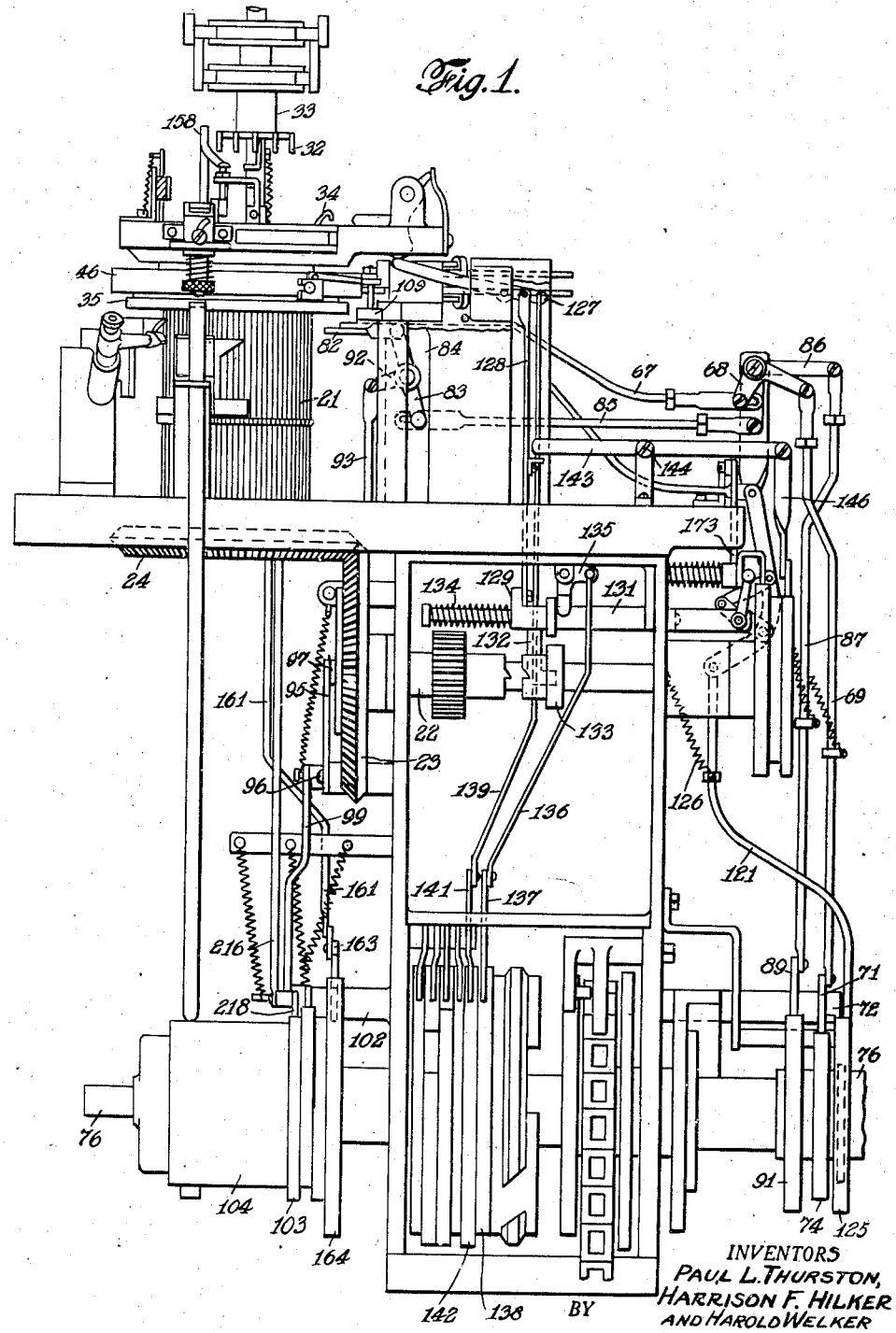
Fig. 1 is a partial front elevation of a knitting machine for carrying out our invention.
Figure 2:
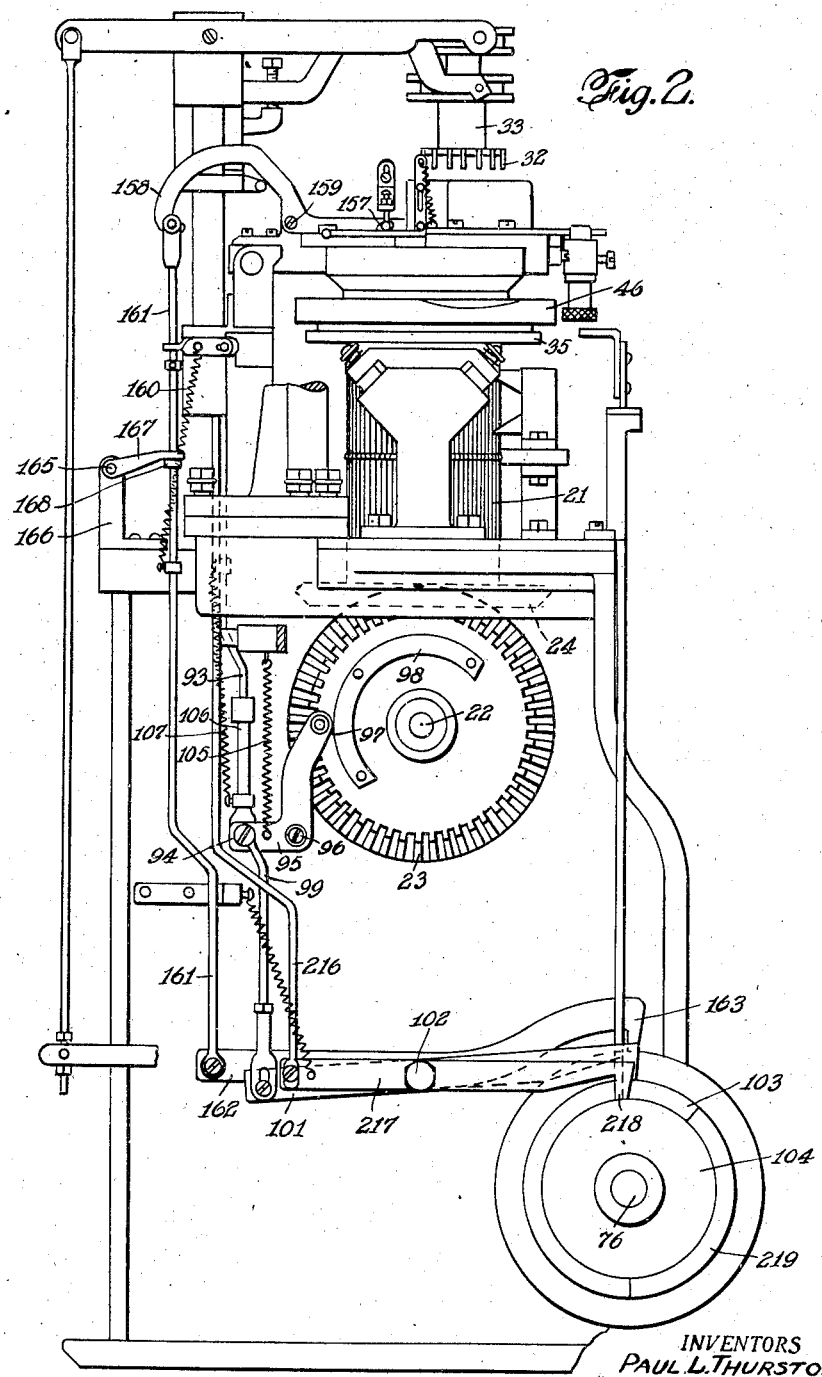
Fig. 2 is a partial side elevation showing the left hand side of the knitting machine illustrated in Fig. 1.
Figure 3:
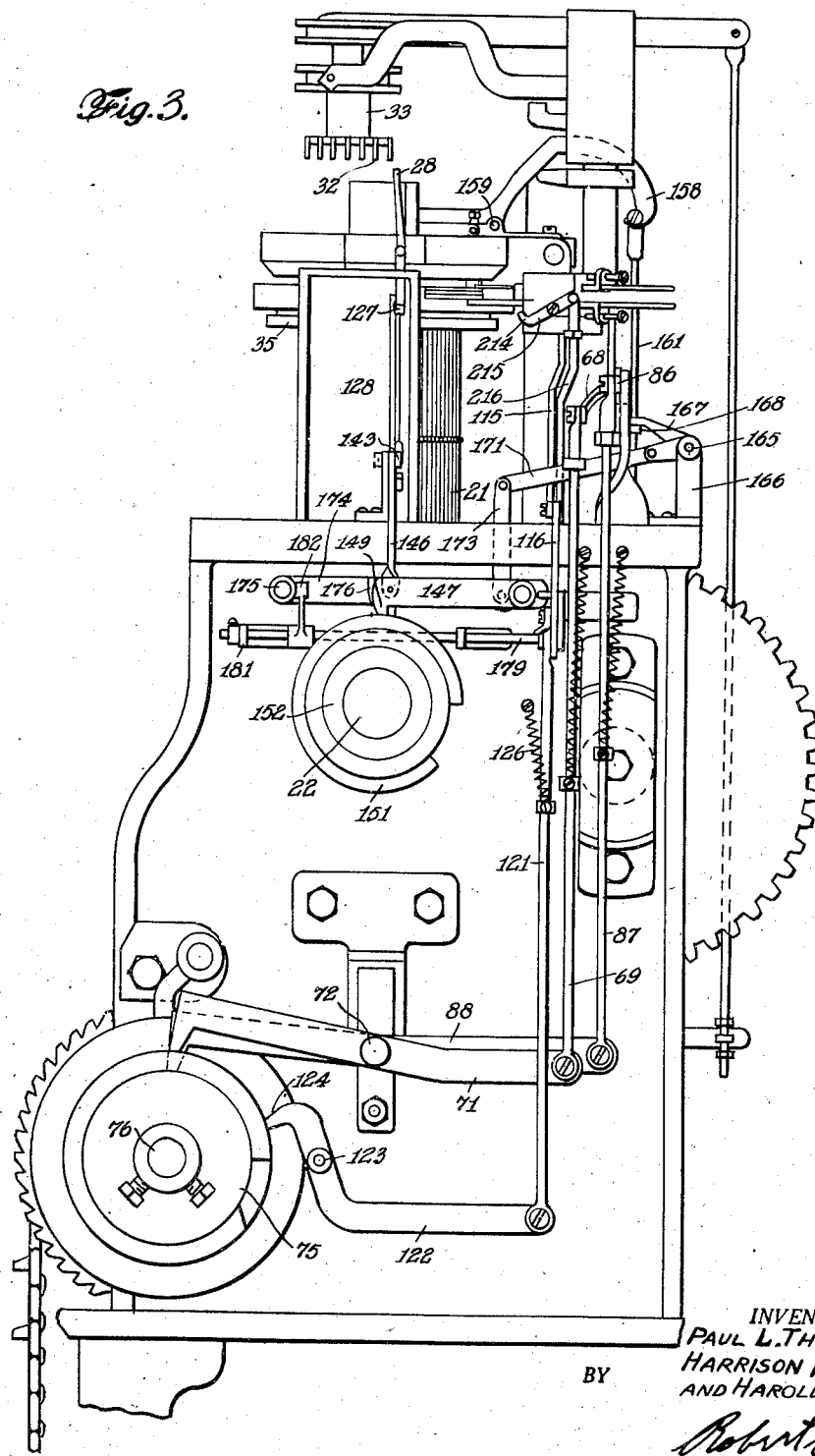
Fig. 3 is a partial side elevation showing the right hand side of the knitting machine illustrated in Fig. 1.

Figs. 7 and 8 are fragmentary vertical sectional views taken on the line 7—7 and 8—8 respectively in Fig. 6.

Fig. 9 is a diagrammatic plan on a reduced scale showing the distribution of the different types of sinkers employed in the machine.

Figs. 10, 11, 12 and 13 are side elevations of four types of sinkers employed.

Fig. 14 is a diagrammatic perspective view showing operating mechanism for two of the sinker actuating cams shown in Figs. 6, 7 and 8.

Fig. 15 is an enlarged diagrammatic view showing the passage of a series of needles through the knitting wave for the feeding of thread to the needles, and the operation of the sinkers.

Figs. 16 and 17 are conventional illustrations of articles of hosiery embodying our invention.

Fig. 18 is a diagrammatic perspective view showing additional control mechanism for making the buffer heel portion of the article of hosiery shown in Fig. 17.

Fig. 19 is a developed elevational view of certain of the needle operating cams and showing stitch slackening mechanism.

Fig. 20 is a plan view of the cams shown in the right hand portion of Fig. 19.

Fig. 21 is a sectional view taken on the line 21—21 of Fig. 20.

Fig. 22 is a diagrammatic perspective view showing mechanism for operating the cams shown in Figs. 20 and 21.

In the figures of drawing showing the machine, certain parts have been omitted and certain other parts have been shown diagrammatically for the sake of greater clarity.

In Fig. 16 of the drawing, there is shown by way of example, an article of hosiery embodying our invention. The embodiment therein shown is illustrated as a men's sock or half hose having a top portion 1, leg portion 2, instep portion 3, high splice portion 4, heel 5, sole 6, toe band 7 and toe 8. Portions of the fabric in the heel, sole, toe band and toe are shown broken away to show the inner face of the fabric. The top portion 1 is preferably formed of fabric having suitable extensibility and recoverability to pass over the heel and yet fit the leg snugly when being worn, for example 1 x 1 rib fabric, or fabric having elastic thread incorporated therein. The leg portion 2 and the instep portion 3, which is understood to include the upper part of the foot and the front part of the ankle, are formed of wrap fabric having a wrap embroidery pattern composed of a plurality of narrow vertical stripes 9. In the specific embodiment shown by way of example in Fig. 16, the leg and instep portions are plain knit, i. e., non-rib fabric. The high splice, heel, sole, toe band and toe portions of the article are formed of terry fabric, composed of body thread and terry thread knit together in such manner as to form loops of terry thread that are longer than the corresponding loops of the body thread stitches, so as to project on a face of the fabric in a form of terry loops. In the embodiment shown the terry loops comprise sinker loops of the terry thread which correspond to but are longer than the sinker loops of the body yarn stitches. The needle loops of the body thread and the terry thread are drawn together and are preferably in plated relation, so that the body thread forms the outer face of the fabric and the terry loops form the inner face. These terry loops provide a soft, cushioning effect that may, if desired, be cut or brushed.

By reference to Fig. 16, it will be seen that the tubular seamless fabric sections comprising the leg portion 1 of the article is formed of wrap embroidery fabric throughout its circumferential or crosswise extent. Each of the vertical stripes 9 of the wrap embroidery pattern is formed by one or more wrap threads incorporated in selected wales of the fabric and extending in a general vertical or walewise direction as distinguished from the body thread which extends crosswise. The wrap embroidery thread is knit in plating relation over the body thread so as to appear on the face of the fabric at the stitches in which it is incorporated.

Following the leg portion there is an integral tubular seamless section composed of wrap embroidery fabric throughout a portion of its circumferential extent to form the instep portion 3, of the article, and composed of terry fabric throughout the remainder of its circumferential extent to form the high splice portion 4 and sole portion 6. Each of the individual courses of this section is thus formed partly as terry fabric and partly as wrap embroidery fabric. In the high splice portion 4 and sole portion 6, the body thread is knit in plated relation over the terry thread, while in the instep portion 3 the wrap thread is plated over the body thread at selected wales to form a continuation of the wrap embroidery pattern in the leg. The wrap pattern may, if desired, extend also into the terry portion forming the high splice 4, as indicated at 11. In this event the body thread is plated over the terry thread and the wrap thread is plated over both the body thread and the terry thread in the wales in which it occurs.

The thread forming the terry loops of the terry portion of the fabric may be an additional thread incorporated only in the terry portions, or it may be a continuous thread extending also across the instep portion 3, where it is knitted in plated relation with the body thread. In the latter case the thread forming the terry loops is preferably also knit as one of the body threads in the leg portion of the article, so that the fabric of the leg portion and the instep portion will be consistent throughout. When the thread which forms the terry loops is knit also in the leg and instep portions, it is fed and knit in such manner as not to interfere with the formation of the wrap embroidery pattern, when introduced as an additional thread in the terry portions only, the ends of the terry thread may, if desired, be knit into the adjacent portions of the non-terry fabric to anchor the ends more securely in the fabric.

Following the section forming the sole and instep portions, there is a further integral tubular seamless section comprising terry fabric throughout its circumferential or coursewise extent and forming the toe band 7. It is thus necessary to provide instrumentalities for forming terry loops around the entire cylinder of the knitting machine on which the article is produced in order that the toe band may be formed of terry fabric throughout. However, as explained below, these instrumentalities are manipulated in such manner as not to interfere with the formation of the wrap embroidery pattern in the patterned portions of the article.

The heel portion 5 and toe portion 8 are formed by oscillation or reciprocation of the needle cylinder, alternate courses being knit during rotation of the cylinder in one direction and intermediate courses by rotation of the cylinder in the other direction. It is thus necessary for the terry forming instrumentalities to be operable in both directions of rotation of the cylinder, and further necessary to maintain or reestablish the separation of the body thread and the terry thread during reversal of the direction of rotation. Particularly in fine gauge machines where the needles are very close together, this presents a difficult problem, but it is satisfactorily accomplished by the present invention as described below.

In Fig. 17, where corresponding parts are designated by the same reference numbers as in Fig. 16, there is shown a further embodiment of our invention, which is similar to the form described above except that a buffer heel portion 12 extends upwardly from the high splice portion 4. This buffer portion is formed of terry fabric and is of less width in a coursewise direction than the high splice 4, heel 5 and sole 6, extending substantially less than halfway around the circumference of the article. Moreover, the wrap embroidery pattern illustrated in Fig. 17 comprises a clock 13 and a plurality of broad vertical stripes 14, each extending over a plurality of consecutive wales of the fabric. It will be seen that the wrap embroidery pattern of the leg extends downwardly beyond the upper extent of the buffer portion 12 and within the coursewise extent of the high spliced portion 4. A portion of the fabric designated by the reference numeral 15 lies closely adjacent the side edges of the buffer portion 12, as clearly shown in the drawing. For example, the wrap stripe portion and terry portion may be in adjacent wales of the fabric. The wrap embroidery pattern may, if desired, terminate upon reaching the high splice portion, as indicated at 16, or may extend into the high splice portion, as indicated at 17.

The embodiment shown in Fig. 17 thus comprises a tubular seamless section composed of wrap embroidery fabric throughout its circumferential extent forming a leg portion of the article, a second integral seamless section comprising terry fabric throughout less than half its coursewise extent to form the buffer portion 12, and comprising wrap embroidery non-terry fabric throughout the remainder of its coursewise extent, a third seamless section comprising terry fabric throughout a greater portion of its coursewise extent to form the high splice portion 4, heel portion 5 and sole portion 6 of the article, and comprising non-terry wrap embroidery fabric throughout the remainder of its coursewise extent to form the instep portion 3, and a fourth seamless section comprising terry fabric throughout its coursewise extent to form the toeband portion 7 of the article. The plating of the respective threads and the knitting of the terry thread, either as an additional thread or as a continuous thread, may be the same as the embodiment shown in Fig. 16.

When the terry thread is introduced as an additional thread in the terry portions only it is desirable to slacken the stitches in said portions to prevent the additional thread resulting in too tight a fabric. Knitting machines are commonly provided with mechanism for slackening the stitches on the sole side of the needle cylinder. Similar mechanism may satisfactorily be used in knitting the high splice and sole portions of the articles described above. However, if such mechanism were to be used in knitting the buffer portion 12 of the sock shown in Fig. 17, it would slacken the stitches not only in the buffer portion but also in the area 18 which is below the upper extent of the buffer portion and within the coursewise extent of the high splice portion 4 and sole portion 6. This would produce an unsightly and undesirable appearance. In accordance with the present invention, this objection is overcome by slackening only the stitches of the terry fabric. When knitting the tubular seamless section of fabric including the buffer heel, the stitches are slackened only on those needles producing the buffer heel 12. When knitting the following section containing the high splice 4 the stitches are slackened on a larger group of needles which produce the high splice and the sole. When the toeband portion is reached, the stitches are slackened throughout the coursewise extent of the fabric.

It will be understood that the wrap embroidery pattern shown in Figs. 16 and 17 are for the purpose of illustration only and that an infinite number of different patterns can be produced by varying the selection of the needles to which the wrap embroidery thread is fed.

In Figs. 1 to 15 and 18 to 22 of the drawings there is shown a knitting machine for producing the articles illustrated in Figs. 16 and 17. The machine may be of the general type of the Banner wrap stripe knitting machine manufactured by the Hemphill Company of Pawtucket, R. I., and the parts of the machine not herein specifically described may be understood to be the same as or similar to the corresponding parts of the Banner machine. The machine has a rotatable needle cylinder 21, driven from the main drive shaft 22 of the machine through intermeshing beveled gears 23 and 24 (Fig. 1), provision being made for reversing the direction of rotation of the shaft so that the needle cylinder may be rotated continuously in one direction counterclockwise, as viewed in Fig. 4, or may be rotated or oscillated alternately in opposite directions.

The needle cylinder carries a plurality of independently operable needles 24 (Fig. 15) provided at their upper ends with the usual hooks and latches and on their lower portions with one or more butts adapted to engage cams for manipulating the needles. The knitting butts of the needles are preferably of different length. For example, the needles on the side of the needle cylinder producing the instep of the article of hosiery may be provided with long butts, while the needles on the opposite or sole side of the needle cylinder have shorter butts. Jacks may also be provided in the needle slots to provide greater selectivity in the needle operation.

At the main feeding station of the machine the needles are manipulated to receive and knit thread fed to the needles by suitable feed fingers (Fig. 15). In the drawings there are shown two adjacent fingers 26 and 27 for feeding body thread to the needles and a finger 28 for feeding terry thread. The body thread feed fingers 26 and 27 are lower than the terry feed finger 28 when in operative position, and the center portion of the throat plate 29 is cut out as indicated at 31. It is thus possible to feed the body thread lower than the terry thread and yet secure the advantage of interchangeability of body thread, so that thread changes can be made as desired. Means controlled by the pattern mechanism of the machine is provided for moving the feed fingers into and out of feeding position.

A plurality of wrap embroidery threads are fed to selected needles in advance of the main knitting station by feed fingers 32 (Fig. 1) carried a rotatable head 33. The head 33 is rotated in synchronism with the needle cylinder, but is off center so that the feed fingers travel in a circular path intersecting the needle circle in such manner that thread fed by the fingers is received by selected needles which have been raised above the adjacent needles. Each of the feed fingers feeds to a particular needle or group of needles so that the wrap embroidery threads incorporated in the fabric extend in a general walewise or vertical direction rather than coursewise. The wrap thread received by the needles from the feed fingers 32 is carried in the hooks of the needles to the knitting wave adjacent the main feeding station where it is knit along with the thread fed at the latter station. During rotation of the needle cylinder the wrap threads are controlled by a horn 34 (Fig. 4) which is located inside the needle circle and engages the wrap threads to control their position and tension and to prevent tangling. By proper control of the tension of the respective threads and their position in the hooks of the needles the threads are knit in proper plating relation with one another, as described above, in conjunction with the articles shown in Figs. 16 and 17. It will be understood that the selection of the needles raised to receive the wrap embroidery thread can be varied as desired to produce an infinite number of different wrap embroidery patterns.

A sinker ring 35 (Fig. 5) associated with the needle cylinder and rotatable therewith carries a circular series of independently operable sinkers 36 which are interposed between the needles and cooperate therewith in knitting the thread fed to the needles, and in forming the terry loops characterizing the terry portions of the fabric. The sinkers 36 have a lower level 37 (Fig. 10) over which loops of body thread are drawn by the needles, and an upper level 38 over which loops of terry thread are drawn so that the loops of terry thread are longer than the corresponding loops of body thread. The upper level is shown formed as an upwardly curved finger 39 which extends over the lower level 37 of the sinker.

The sinkers 36 are radially movable in slots formed in the sinker ring 35 and are provided with butt portions adapted to engage cams for manipulating the sinkers as the needle cylinder and sinker ring revolve. The formation of terry loops is controlled by the way in which the sinkers are manipulated in cooperation with the manipulation of the needles. As explained above, the terry thread 41 is fed to the needles above the body thread 42, so that the needles are drawn down in the knitting wave, the two threads come together in the form of a V as shown in Fig. 15. By moving the sinkers inwardly in predetermined timed relation with the downward movement of the needles, the curved points 39 of the sinkers are inserted between the body thread and terry thread, thereby separating the two threads so that loops of terry thread are drawn over the upper level 38 of the sinkers, while loops of body thread are drawn over the lower level 37, thereby producing the terry fabric. If the inward movement of the sinkers is delayed, the threads are not separated and loops of both threads are drawn over the lower level of the sinkers, thus forming loops of the same length and producing non-terry fabric. It is thus possible to produce non-terry fabric even though the feeding of the so-called terry thread is continued. For example, in knitting the leg and instep portions of the article shown in Fig. 16, the terry thread can be fed to the needles along with the body thread and will be knitted in plated relation therewith without producing terry fabric. If, on the other hand, the sinkers are moved in too early, the curved fingers 39 will come under both the terry thread and the body thread so that extra long loops are drawn of both threads, producing a loose, lacy fabric.

The timing of the movement of the sinkers to separate the terry thread and body thread must be much more precise in a fine gauge machine than in a coarser machine, since the vertical separation of the respective thread feeds is strictly limited. If the terry thread is fed too high it will not be taken by the needles, while if the body thread is fed too low, the light weight relatively weak thread used in fine gauge work will be cut by the closing of the latches.

In knitting the heel and toe portions where the machine is operated by oscillation of the needle cylinder, it will be understood that the direction in which the needles travel past the feeding station reverses with each reversal of direction of rotation of the cylinder. During this reversal the separation between the terry thread and the body thread fed to the needles tends to become indistinct and there is danger of both threads getting below the fingers 39, so that no terry loops will be produced, or of both threads getting above the finger 39, causing a course of loose stitches. In either instance the defect will persist throughout the course, since the close spacing of the needles of a fine gauge machine makes it impossible for the sinkers to separate the threads once they have started knitting with both threads under or both above the curved fingers 39 of the sinkers. It is therefore desirable to allow the threads to straighten out after reversal of the direction of rotation before moving the sinkers in to form terry loops.

In the embodiment illustrated in the drawings, five types of sinkers are employed, the different types being shown in Figs. 7, 10, 11, 12 and 13, and the arrangement of the sinkers in the sinker ring being shown diagrammatically in Fig. 9. On the side of the sinker ring corresponding to the needles that produce the instep portion of the article shown in Fig. 16, i. e., from point A to B in Fig. 9, the sinkers are provided with low butts, as shown in Fig. 11. The sinkers on the opposite or sole side of the sinker ring have high butts and are of four different types. Between the points B and C, and H and A the sinkers are of the kind shown in Fig. 10. Between the points C and D, E and F, and G and H the sinkers are of the kind shown in Fig. 7. Between the points D and E there is provided a small group of consecutive sinkers, for example six or eight sinkers having a notch 43 in the middle of the sinker butts, as illustrated in Fig. 13. Between the points F and G there is a corresponding group of consecutive sinkers having a notch 44 as shown in Fig. 12. It will be noted that the sinkers between the points C and H, i. e., the sinkers shown in Figs. 7, 12 and 13, have tail portions 45, while the remaining sinkers are shown without tails. It will be understood that the latter group of sinkers may, if desired, have shorter tails instead of no tails at all.

The sinkers are manipulated by cams carried by a sinker cap 46 (Figs. 5 and 6) which is mounted above the sinker ring but does not rotate therewith. The sinker cams include a fixed cam 47 adapted to move all of the sinkers radially outwardly and cams 48 and 49 for moving all the sinkers radially inwardly. However, the movement of the sinkers inwardly by cams 48 and 49 comes at a point too late to separate the terry thread and body thread. Hence, when the sinkers are operated solely by the fixed cams, non-terry fabric will be produced.

For manipulation of the sinkers to effect a separation of the threads to produce terry loops there are provided a plurality of movable cams acting selectively on the different types of sinkers. An upper rear cam 51 is swingable about a pivot 52 into and out of operative position, and when in operative position is adapted to engage all of the high butt sinkers except those having the top notch 44 (Fig. 12) to move said sinkers inwardly to separate the threads and produce terry loops. It will be seen that the sinkers are moved inwardly by cam 51 at a point in advance of fixed cam 48. A lower rear cam 53 similar in shape to cam 51 and likewise swingable about pivot 52 is adapted, when in operative position, to engage all of the sinker butts except those having a middle notch 43 (Fig. 13). A tail cam 54 having a similar working face and pivoted in like manner to swing about pivot 52, is adapted, when in operative position, to engage the long tail sinkers shown in Figs. 7, 12 and 13. Cams 51, 53 and 54 all act on the sinkers when the needle cylinder is rotated in a counterclockwise direction, which is the direction the cylinder turns during continuous rotation.

When the needle cylinder and sinker ring are rotated in a clockwise direction, as when the machine is operating by oscillation of the needle cylinder, the sinkers are operated by stationary cams 47 and 49 referred to above, and also by a movable cam 55 swingable into and out of operative position about a pivot 56 and adapted when in operative position to engage all of the high butt sinkers except those having a top notch 44 (Fig. 12).

It will be understood that sinkers engaged by upper rear cam 51, lower rear cam 53, or tail cam 54, when in operative position, will be moved inwardly at a point in advance of fixed cam 48 and will separate the terry thread and body thread so as to form terry fabric. The sinkers after being moved in by cam 51, 53 or 54, to receive the terry thread on the curved fingers 39 of the sinkers, are drawn back slightly by a point 57 on cam 47 (Fig. 6) and are then again moved inwardly by fixed cam 48. The backward movement of the sinkers by the cam point 57 causes the curved fingers 39 to draw more thread from the needles to form longer terry loops and also to draw slack in the thread so that it will not be broken when the needles are drawn on down. The further downward movement of the needles is coincident with the inward movement of the sinkers by cams 48 so that the terry thread slides down to the lower portions of the curved fingers 39. A similar cam point 58 on the opposite side of cam 47 acts in a similar way in conjunction with cams 55 and 49 when the needle cylinder is rotated in a clockwise direction.

The upper rear cam 51 is movable into and out of operative position by mechanism shown particularly in Figs. 1, 4, 6 and 14. A light spring 59 on the sinker cam 46 tends to move cam 51 into inoperative position. The cam is moved to operative position by a plunger 61 which is slidably mounted in a bracket 62 and is adapted to engage a projection 63 (Fig. 6) on the cam. The plunger 61 is moved in toward cam 51 by a tension spring 64 which is stronger than the light spring 59, and hence tends to hold the cam 51 inwardly in operative position. The plunger 61 is movable outwardly by a lever 65 (Figs. 4 and 14) pivoted on a bracket 66 and connected by a link 67, bellcrank 68 and a second link 69 with a cam lever 71 pivoted at 72 and having a nose portion 73 adapted to engage a cam 74 on an auxiliary pattern drum 75 mounted on the right hand end of the main pattern shaft 76. It will be seen that with the connections referred to the pivoted lever 65 will be swung about its pivot in a counterclockwise direction when the nose portion 73 of cam lever 71 rides up on cam 74, thereby drawing back the plunger 61 and permitting cam 51 to be moved to inoperative position by its spring 59.

The lower rear cam 53 is likewise movable to inoperative position by a light spring 77, and is engageable by a similar plunger 78 having a spring 79 which is stronger than the spring 77 and hence tends to hold the cam 53 in operative position. The operation of the plunger 78 and hence the movement of cam 53 is subject to three separate controls. A lever 81 pivoted at 66 has one end connected with plunger 78 and the other end connected through a short link 82 with the upper end of a vertical lever 83 (Figs. 1, 4 and 14) which is pivotally mounted on a bracket 84. The lower end of lever 83 is connected through a link 85, bellcrank 86 and a second link 87 with a cam lever 88 pivoted at 72 and having a nose portion 89 adapted to engage a cam segment 91 on the auxiliary pattern drum 75. Lost motion is provided in the connections between the lever 81 and the link 82 and also between the lower end of the vertical lever 83 and the link 85, for example, by slot and pin connections as shown. With the connections shown and described it will be seen that the plunger 78 is pushed inwardly to move cam 53 to its operative position when the nose portion 89 of cam lever 88 rides upon cam segment 91.

The vertical lever 83 also has a short arm 92 which is connected by a link 93 (Figs. 1 and 2) with an arm 94 of bellcrank 95 which is pivoted at 96 and is provided at its other end with a roller 97 adapted to engage an arcuate cam segment 98 on the bevelled gear 23 through which the needle cylinder is driven. The arm 94 of bellcrank 95 is also connected by link 99 with cam lever 101 pivoted at 102 and having a nose portion adapted to engage a cam 103 on the main pattern drum 104. A spring 105 connected to the bellcrank 95, tends to rock both the bellcrank and also cam lever 101 in a clockwise direction, as viewed in Fig. 2. When the nose portion 101 rides up on cam 103 the cam lever and the bellcrank 95 are rocked in a counterclockwise direction so that the roller 97 is held out of engagement with the cam segment 98 and through the connections described above, the plunger 78 is drawn back away from the needle cylinder so that cam 53 (Fig. 6) is moved by its spring 77 to inoperative position. When the nose of the cam lever 101 rides off of cam 103 the roller 97 on bellcrank 95 engages the cam segment 98 on beveled gear 23. When the roller 97 rides up on cam segment 98 the sinker operating cam 83 is moved to inoperative position. When roller 97 rides off of segment 98 cam 53 is moved inwardly to operative position. As the bevelled gear 23 carrying cam segment 98 rotates at the same speed as the needle cylinder, it will be seen that the cam 53 is moved into operative position at a particular point in the rotation of the cylinder, as will be described more fully below.

In the link 93 connecting the bellcrank 95 with the arm 92 of pivoted lever 83 there is provided an extensible slip-joint 106 comprising relatively slidable parts held together against fixed stops by a tension spring 107. This slip-joint makes it possible for the cam 53 to be held in operative position under action of pattern 91 (Fig. 14) and cam lever 88 even though cam lever 101 is in a position which would otherwise cause the cam 53 to be moved to inoperative position. The spring 107 is in this instance overpowered by the mechanism actuated by pattern cam 91, as described above.

The front sinker cam 55 which is swingable about its pivot 56 into and out of operative position is resiliently held in operative position by a leaf spring 108. The cam is movable to inoperative position by a roller 109 (Figs. 6 and 8) which is carried on the lower end of a shaft 111 extending downwardly from cam 55 and is adapted to engage a segmental ring cam 112 (Fig. 5) mounted on the periphery of the sinker ring 35. When the roller 109 rides up on the cam segment 112 the front sinker cam 55 will be moved outwardly to inoperative position, and conversely when the roller 109 rides off of cam segment 112, the cam 55 will be moved inwardly to operative position by its spring 108. The inward and outward movement of cam 55 is timed to occur in predetermined relation to the rotation of the needle cylinder, as explained below.

The sinker tail cam 54 (Figs. 6 and 7) is provided with a spring (not shown) tending to move the cam outwardly to inoperative position. The cam is movable inwardly to operative position by a finger 113 (Fig. 18) carried at one end of a pivoted lever 114 and adapted to be pressed against the cam. The other end of pivoted lever 114 is connected by a link 115 to the upper arm 116 of a bellcrank lever 117 which is pivoted to a stationary bracket at 118. The lower arm 119 of the bellcrank lever is connected by a link 121 to a cam lever 122 pivoted at 123 and having a nose portion 124 adapted to engage a segmental cam 125 on auxiliary pattern drum 75. A tension spring 126 tends to move the link 121 upward, holding the nose of the cam lever 122 in engagement with the pattern drum. When the nose of cam lever 122 rides up on cam 125 the link 121 moves downwardly against the action of spring 126, and through the connections described, the finger 113 is moved out away from the sinker tail cam 54, permitting the cam to be swung outwardly to inoperative position by its spring.

The pattern cam 125 which controls the operation of the sinker tail cam 54 also controls the feed finger and the cutter and binder for the terry thread. The terry feed finger 28 (Fig. 15) is subject to four separate, yet interrelated controls. During the knitting of the leg portion of the sock, the terry thread feed finger is, in the particular embodiment shown, held out of operation so that no terry thread is fed to the needles. During the knitting of the buffer portion 12 of the article of hosiery shown in Fig. 17, the terry thread feed finger is moved into and out of feeding position each revolution of the needle cylinder, so that terry thread is fed to the needles knitting the buffer portion 12 but not to the needles on the instep side of the cylinder. During the knitting of the high splice portion 4 and sole portion 6, the terry thread feed finger is likewise moved into and out of feeding position each revolution of the needle cylinder, but it remains in feeding position during a greater portion of each revolution so that terry thread is fed to the larger group of needles extending approximately halfway around the needle cylinder, which produce the high splice and sole portions of the sock. During the knitting of the toe band 7, the terry thread finger remains continuously in feeding position so as to feed terry thread to all of the needles.

The terry thread feed finger 28 (Fig. 15) is resiliently held in feeding position by a spring (not shown) and is movable to non-feeding position by means of a pivoted lever 127 (Figs. 1 and 18). The inner end of the lever 127 is adapted to engage the feed finger to push it upwardly out of feeding position. The outer end of lever 127 is connected by a link 128 with a forwardly extending arm 129 on a sleeve 131 which is oscillatable and also axially reciprocable on a stationary shaft. The sleeve 131 is provided with a second arm 132 adapted to engage a cam 133 on the main drive shaft 22 of the machine. A helical torsion and compression spring 134 resiliently holds the arm 132 of sleeve 131 in contact with the arm 133. When the arm 132 rides up on the raised portion of cam 133 the sleeve 131 is rocked about its shaft, causing arm 129 to pull downwardly on connecting link 128, thereby moving the terry thread feed finger out of operative position. The raised portion on cam 133 extends approximately halfway around the cam. As the main shaft 22 rotates at the same speed as the needle cylinder, the terry thread feed finger will be in feeding position for approximately one half of each revolution to feed thread to the needles forming the high splice portion 4 and sole portion 6 of the article of hosiery shown in Fig. 17.

The mechanism just described for moving the terry thread feed finger into and out of operative position during each revolution of the needle cylinder, may be rendered inoperative by shifting the rock sleeve 131 axially toward the left (Fig. 1), so that the arm 132 does not engage cam 133. Means for shifting the sleeve in this manner is shown as a bellcrank 135 engaging a collar on sleeve 131 and connected by a line 136 with one end of a pivoted cam lever 137, the other end of which engages a cam 138 on the main pattern drum. By shifting the sleeve 131 to the left, as described, so that the arm 132 does not engage cam 133, the terry thread feed finger can be permitted to remain continuously in feeding position, as for example, when feeding terry thread to all of the needles during the knitting of the terry toe band 7 of the article shown in Fig. 17.

The outer end of the lever 127 operating the terry thread feed finger is also connected by means of a link or wire 139 with one end of a pivoted cam lever 141, the opposite end of which is adapted to engage a cam section 142 on the main pattern drum of the machine. When the nose of cam lever 141 rides up on the raised cam section 142, the link 139 is pulled downwardly causing the terry thread feed finger to be held out of feeding position.

During the knitting of the buffer heel 12 of the article shown in Fig. 17, the terry thread feed finger is moved into and out of feeding position in timed relation with the rotation of the needle cylinder so as to remain in feeding position substantially less than one half of each revolution. The mechanism for accomplishing this movement is shown diagrammatically in Fig. 18 and appears also in Figs. 1, 3 and 4. The inner end of lever 143, pivoted at 144, is connected with the terry feed finger operating the lever 127, for example, by engaging a projection 145 on link 128. The outer end of lever 143 is connected by link 146 with cam follower 147, pivotally mounted on a horizontal post 148 and having a nose portion 149 adapted to engage a cam segment 151 mounted on an auxiliary control drum 152 on the main drive shaft 22. When the nose of cam follower 147 rides up on the raised portion of cam segment 151 the pivoted lever 143 is rocked about its pivot in a counterclockwise direction, as viewed in Figs. 1 and 18, pulling downwardly on the outer end of lever 127 and thereby causing the inner end of the lever to lift the terry thread feed finger to non-feeding position. The timing is such that the feed finger is permitted to be in feeding position only during passage of the group of needles which form the buffer heel portion 12 of the article shown in Fig. 17.

The cam follower 147 is resiliently held at the outer end of its pivot post 148 by means of a compression spring 153. A projection 154 on the bellcrank lever 117 (Fig. 18) referred to above is adapted to engage the cam follower 147 near its pivot, and to shift the follower inwardly on its pivot post 148 when the bellcrank 117 is rocked in a counterclockwise direction, as viewed in Fig. 18. The shifting of the cam follower 147 in this manner causes the nose portion of the cam follower to be shifted laterally out of register with the cam segment 151, thereby rendering inoperative the mechanism described above for moving the terry thread feed finger into and out of feeding position during the knitting of the buffer portion 12 of the article shown in Fig. 17. The terry thread feed finger is thus held out of operative position by the pattern cam 142 (Fig. 1) during the knitting of the leg, is moved into and out of feeding position by the control cam 151 (Fig. 18) during the knitting of the buffer heel portion, is moved into and out of feeding position with different timing by the cam 133 (Fig. 1) during the knitting of the high splice and sole portions, and is permitted to remain continuously in feeding position during the knitting of the toe band by shifting the rock sleeve 131 (Fig. 1) to the left so that the arm 132 is not engaged by cam 133.

The movement of the terry thread feed finger into operative position for substantially less than one half of each revolution during the knitting of the buffer portion 12 of the article of Fig. 17 also requires special operation of the cutter and binder mechanism for the terry thread. The movable blade 155 of the cutter and binder mechanism shown schematically in Fig. 5 is normally operated through an arm 156, a link 157, a rocker arm 158 pivoted at 159, and a link 161 connected to one end of a cam lever 162 (Fig. 2), which is pivoted at 102 and has a nose portion 163 adapted to engage a cam 164 on the main pattern drum. A tension spring 160 acting on link 161 tends to oppose the action of the cam. The operation of the cutter and binder is thus normally controlled from the main pattern drum. However, during the knitting of the buffer portion 12 of the article shown in Fig. 17, the cutter and binder is operated by the special mechanism shown schematically in Fig. 18. A rockshaft 165 extends across the back of the machine, being rotatably supported by suitable brackets 166 and has at one end a forked arm 167, straddling the above mentioned link 161 and engaging a collar 168 adjustably secured on the link. On the other end of rock shaft 165 there is another arm 169 loosely connected with one end of a lever 171 pivoted at 172 and having the other end connected by a link 173 with the free end of a cam follower 174, pivotally mounted on a pivot post 175. The cam follower 174 has a laterally projecting nose portion 176 adapted to engage a cam segment 177 mounted on the auxiliary control drum 152 on the main drive shaft 22. When the nose portion 176 of the cam follower rides up on the cam segment 177 the free end of the cam follower is raised and acts through the connections described to rock the shaft 165 in a counterclockwise direction, as viewed from the right hand end of the shaft, and thereby move link 161 downwardly to open the clamp to receive the terry thread. As the clamp and cutter for the terry thread and the terry thread feed finger both are operated by cam segments on the auxiliary control drum 152 during the knitting of the buffer portion 12, it will be understood that they can be operated in accurate timed relation to one another by the relative positions of cam segments 151 and 177 on the drum.

To interrupt the operation of the clamp and cutter by the cam 177 provision is made for shifting the cam follower out of operative relation with the cam. A compression spring 178 on pivot post 175 tends to hold the cam follower 174 at the outer end of the pivot post. A rock shaft 179 rotatably supported by bracket 181 extends approximately parallel to the cam follower 174 and has an arm 182 engaging the cam follower near its pivot. The rock shaft 179 has a second arm 183 connected by a short link 184 with the above mentioned bellcrank 117 (Fig. 18) at a point slightly above the pivot 118 of the bellcrank. When the bellcrank is rotated in a counterclockwise direction by engagement of the nose 124 of the cam lever 122 with the cam segment 125, the rock shaft 179 is rotated counterclockwise, as viewed from the front of the machine, thereby shifting the cam follower 174 laterally inwardly on the pivot post 175 and moving the nose portion 176 out of registry with the cam 177. The pattern cam 125 and associated parts thus provide a unified control for the terry thread feed finger 28 (Fig. 15) the sinker tail cam 54 (Fig. 6) and the cutter and clamping blade 155 (Fig. 5) for the terry thread.

As stated above, it is desirable when knitting the buffer portion of the article of Fig. 17 to slacken the stitches in the terry fabric of the buffer portion without slackening the stitches in the adjacent portions of non-terry fabric. When knitting the high splice portion 4 and the sole portion 6, on the other hand, the stitches on a greater number of needles must be slackened since the high splice and heel portions are of substantially greater coursewise extent than the buffer portion 12. Mechanism for accomplishing these results is shown schematically in Figs. 19 to 22. In Fig. 19 there are shown in a developed view certain of the cams for operating the needles, including raise cams 185, a center cam 186, and stitch cams 187 and 190. After the needles are drawn down by cam 187 to draw stitches of the thread, they are again raised by engagement with a raiser cam 188. The cam 186 is a composite cam comprising an outer cam element 189 (Fig. 21) and inner cam element 191, and an intermediate cam element 192. The outer cam is mounted stationarily, though preferably adjustably, on a fixed part of the machine, while cam elements 191 and 192 are relatively slidable in a circumferential direction relative to cam element 189 and relative to each other.

The needles in the needle cylinder are provided with at least three lengths of butts. The needles on the instep side of the cylinder corresponding to the section from A to B in Fig. 9 have long butts, the needles corresponding to the sections B—C and H—A have short butts, and the needles corresponding to the section C to H have extra short butts. It will be noted that the distance C to H corresponds to the coursewise extent of the buffer portion 12 of the article of Fig. 17. The relation of the composite raise cam 188 to the needle cylinder is such that cam element 189 engages only the long needle butts, cam element 192 engages long and short needle butts, and cam element 191 engages all the needle butts. The slackening of the stitches on the different groups of needles is controlled by the relative positions of cam elements 189, 191 and 192. When the working faces of all three cams are in line with one another, all of the needles are raised at the same point and the stitches are all of the same length throughout the coursewise extent of the fabric. When cam element 191 is drawn back slightly, as shown in Fig. 19, the long butt and short butt needles will ride up aligned cams 189 and 192 while the extra short butt needles will not be raised until they reach cam 191, being thereby raised later than the other needles. As the needles of a knitting machine pass through the knitting wave to draw stitches, a certain amount of thread is "robbed" from previously drawn stitches, and since, in accordance with the present invention, the extra short butt needles remain down longer than the other needles when cam 191 is drawn back, as just described, less thread will be "robbed" from the stitches drawn by the extra short butt needles than from the remaining stitches of the course, and the stitches formed by the extra short butt needles will thus be slackened. As indicated above the extra short butt needles are the ones that produce the buffer portion 12 of the article shown in Fig. 17. When knitting the high splice portion 4 and sole portion 6, cam element 191 and also cam element 192 are drawn back so that stitches are slackened in like manner on both the extra short butt needles and the short butt needles, or in other words, on all the needles on the sole side of the needle cylinder corresponding in coursewise extent to the high splice portion and the sole.

Mechanism for automatically controlling the positions of cam elements 191 and 192 is shown schematically in Fig. 22. Cam element 191 is slidably mounted on a fixed part of the machine, for example, by means of screws 193 extending through elongated slots 194 in the cam element and is provided with an abutment 195 adapted to engage an arm 196 on a rock shaft 197, which is rotatably supported for example, by a bracket 198. At the other end of the rock shaft 197 there is provided a second arm 199 connected by a link 201 with a cam lever 202 pivoted at 203 and having a nose portion 204 adapted to engage cam segments 205 on the main pattern drum 104. When the nose portion 204 of the cam lever 202 rides up on one of the cam segments 205, the upper end of the arm 196 on rock shaft 197 is moved forwardly, i. e., to the left as viewed in Fig. 22, thereby advancing cam 191 so that its working face is aligned with that of stationary cam 189. When the nose portion 205 rides off of the cam segment the arm 196 is moved back, permitting the cam element 191 to be moved rearwardly by the drag of the needles so as to occupy the position shown in Fig. 19. Similar mechanism is provided for controlling cam element 192, which is slidably held between the other two cam elements. Thus, a cam segment 206 on pattern drum 104 engages the nose portion 207 of a cam lever 208 pivoted at 203 and connected by a link 209 with an arm 211 on a rock shaft 212 having an inner arm 213 engaging a pin 214 which projects outwardly from the cam element 192. The control mechanism for cam element 192 operates in a similar manner to that just described for cam element 191. The two movable cam elements 191 and 192 of the three part composite cam 188 are thus independently controlled by their respective pattern cams, 205 and 206.

During the knitting of the heel and toe portions when the machine is being operated by oscillation of the needle cylinder and the needles on the instep side of the needle cylinder are inoperative, the stitches drawn by the needles producing the heel and toe are slackened by downward movement of the cam block carrying the stitch cams 187, 190 (Fig. 19) causing the needles to draw longer stitches. This adjustment of the cam block results in the needles being drawn down both further and earlier and interferes with the active timing of the entry of the curved fingers 39 of the sinkers between the terry thread and body thread to separate the threads and thereby produce terry fabric. In accordance with our invention this difficulty is overcome by the mechanism shown in Fig. 3. During oscillation of the needle cylinder, sinker cap which carries sinker operating cams "shogs" or oscillates slightly within predetermined limits, being carried around with the needle cylinder a short distance upon each reversal of rotation. The shogging of the sinker cap is ordinarily limited by fixed adjustable stops, one of which also determines the position of the sinker cap when the needle cylinder is operated by continuous rotation in a counterclockwise direction. In accordance with our invention, means is provided for controlling the position of the sinker cap to secure accurate timing of the entry of the fingers 39 between the threads under all conditions. In the embodiment of our apparatus shown in the drawings (see Figs. 2 and 3), a finger 214, pivoted at 215, has its outer end connected by a link 216 with one end of a cam lever 217 (Fig. 2) which is pivoted at 102 and has a nose portion 218 adapted to engage a cam segment 219 on the pattern drum 104. When the nose portion 218 of the cam lever 217 rides up on cam segment 219, the inner end of the pivoted lever 214 (Fig. 3) is moved upwardly in position to engage an abutment on the sinker cap, and thereby determine its position. When the inner end of lever 214 is moved downwardly to the position shown in Fig. 3, it does not engage the said abutment and the position of the sinker cap is thereupon determined by the usual adjustable stop. When knitting by continuous rotation of the needle cylinder, the pivoted lever 214 is in inoperative position as shown. When knitting terry portions by reciprocation of the needle cylinder, as in knitting the heel and toe, the inner end of lever 214 is raised to operative position so that the sinker cap is not permitted to oscillate as far in a counterclockwise direction, thereby causing earlier entry of sinker fingers 39 between the body thread and terry thread to compensate for the needles being drawn down earlier to produce a longer stitch.

While it will be understood that our invention is not limited to the specific articles of hosiery shown in the drawings, the operation of the machine will be described with reference to the article shown by way of example in Fig. 17. The rib knit top portion 1 may be produced on another knitting machine and transferred to the needles of the present machine, in a manner well known in the art. The operation of the machine will therefore be described beginning with the knitting of the leg portion 2. During the knitting of the leg, wrap embroidery thread is fed to selected raised needles by the wrap thread feed guides 32 in advance of the main knitting station, and body thread is fed to all the needles by one or other of the feed fingers 26, 27 (Fig. 15), the needles being manipulated to produce plain knit fabric and to knit the wrap embroidery thread in plating relation over the body thread to form a wrap embroidery pattern. This operation is continued with such variation of the needle selection as is required to produce the desired design until the beginning of the buffer portion 12 is reached. During the knitting of the wrap embroidery of the leg portion 2, the terry thread feed finger 28 (Fig. 15) is held out of feeding position by the pattern cam 142 (Fig. 1), so that no terry thread is fed to the needles. It will be understood, however, that if desired toe so-called terry thread may be fed as an additional body thread to be knit along with the body thread fed by feed finger 26 or 27. The movable sinker operating cams 51, 53 and 54 (Fig. 7) are all held out in inoperative position so that the sinkers are operated by the stationary cams 47 and 48 (Fig. 6) and are therefore moved inwardly too late to produce any separation of threads fed to the needles. Hence, even if thread is fed to the needles by feed fingers 28 (Fig. 15) no terry loops will be formed and the fabric produced will be non-terry fabric. It will thus be seen that during the knitting of the leg portion the mechanism for producing terry fabric in no way interferes with the knitting of wrap embroidery fabric by the needles.

Upon reaching the upper edge of the buffer portion 12 (Fig. 17) the machine is operated to produce terry fabric in the buffer portion and wrap embroidery, non-terry fabric in areas 18 and in the instep portion 3 of the tubular seamless section being knit. Hence, part of each successive course is knit of terry fabric and the remainder is knit as wrap embroidery non-terry fabric. The terry thread feed finger is put into operation by cam lever 141 (Fig. 1) riding off of the high portion of pattern cam 142 to permit the terry thread finger to be moved to feeding position by its spring. At about the same time the nose portion 124 of cam lever 122 rides off the high portion of pattern cam 125 (Fig. 18) so that bellcrank 117 is rocked slightly in a clockwise direction, permitting cam follower 147 to be shifted outwardly by its spring 153 to bring the nose portion 149 of the came follower into registry with the cam segment 151 on cam drum 152. As the cam drum 152 is rotated at the same speed as the cylinder the terry thread feed finger will be moved in and out each revolution of the needle cylinder so that it is in feeding position only during the portion of each revolution corresponding to the knitting of buffer portion 12 (Fig. 17). The rocking of bellcrank 117 also permits cam follower 174 to be moved outwardly to the end of its pivot post by spring 178, thereby bring the nose portion 176 of the cam follower into position for engagement with cam section 177 so that the cutter and binder for the terry thread is operated in timed relation with the tery thread feed finger, as described above. The sinker tail cam 54 (Fig. 7) is also moved inwardly to operative position by operation of the cam lever 122 and bellcrank 117, so that the tail cam engages all of the sinkers having long tails and moves these sinkers inwardly in advance of the stationary sinker cam 48 (Fig. 6) so that the curved fingers 39 of the sinkers are inserted between the body thread and terry thread to separate the two threads and produce terry loops. As explained above, the sinkers having long tails correspond to the needles that produce the buffer portion 12. The remaining sinkers are not moved inwardly until they reach the stationary cam 48 (Fig. 6) which is too late to separate the threads, so that non-terry fabric is produced during the balance of the coursewise extent of the fabric. In knitting the particular embodiment shown in Fig. 17 the wrap embroidery design does not extend into the buffer portion 12, but does extend downwardly alongside the buffer portion closely adjacent to the lateral edges thereof. This is accomplished by not feeding the wrap embroidery thread to any of the needles of the group producing the buffer portion 12, but feeding it to closely adjacent needles, and other selected needles on the instep side of the needle cylinder, so that the wrap embroidery pattern is extended down into the instep. In order to slacken the stitches in the buffer portion 12 to accommodate the additional terry thread, the inner cam element 191 (Figs. 19 to 22) is drawn back under action of pattern cam 205. The stitches throughout the remainder of the coursewise extent of the fabric remain the same.

When the beginning of the high splice portion 4 (Fig. 17) is reached, the nose 124 of cam lever 122 (Fig. 18) rides up on cam segment 125 and through the connecting linkage shifts cam follower 147 to the left, so that it is not engaged by its cam 151. The terry thread feed finger is thereupon moved in and out during each revolution of the needle cylinder by operation of the cam 133 (Fig. 1) and remains in feeding position a longer period during each revolution corresponding to the greater coursewise extent of the high splice portion 4 in comparison with the buffer portion 12 of the article being knit. Cam follower 174 (Fig. 18) is likewise shifted to the left through operation of the cam lever 122 and bellcrank 117 so that the nose portion 176 of the cam follower is no longer engaged by its cam 177 and the operation of the cutter and binder 155 (Fig. 5) by cam 177 is thereby interrupted. During the knitting of the high splice portion the terry thread is severed by another cutter and binder which is indicated at 221 in Fig. 4 and is operated through an arm 222, rock shaft 223 and a second arm 224, which latter is engaged by the terry thread feed finger 28, so that the cutter and binder is operated in exact timed relationship with the feed finger. The tail sinker cam 54 (Fig. 7) is withdrawn through operation of the cam lever 122 (Fig. 18) and the upper rear cam 51 is moved into operative position by its control mechanism. The cam 51 engages the high butt sinkers, i. e., the sinkers on the sole side of the needle cylinder, and moves these sinkers inwardly to terrying position, so that terry fabric is produced in the high splice while non-terry fabric is produced in the instep portions of the same courses. While the small group of sinkers between points F—G (Fig. 9) having a top notch 44 (Fig. 12) are not pushed in all the way by the upper rear cam 51, they are pushed in part way by this cam, and owing to the speed of the machine, are carried on in by their inertia, so that there is no interruption of terry fabric at this point. Alternatively, the sinker tail cam 54 may be kept in operating position during the knitting of the high splice so that this group of sinkers is moved inwardly by engagement of the cam 54 with their tail portions. The feeding of wrap embroidery thread to selected needles on the instep side of the needle cylinder is continued to extend the wrap embroidery pattern into the instep, and if desired wrap embroidery thread can also be fed to selected needles forming the terry fabric of the high splice portion, so that the wrap embroidery pattern will also extend into the terry fabric, as indicated at 17 in Fig. 17. Upon reaching the high splice the intermediate cam 192 (Fig. 21) is drawn back by its control mechanism (Fig. 22) so that the stitches on both the short butt and the extra short butt needles are slackened in the manner described above. These needles correspond in coursewise extent to the terry fabric of the high splice portion.

Upon reaching the heel portion 5, the machine is operated by reciprocation of the needle cylinder. The terry thread feed finger is kept in feeding position either by shifting the rock sleeve 131 (Fig. 1) to the left so that the arm 132 does not engage cam 133, or by throwing another terry thread feed finger into operative position. No operation of the cutter and binder is required as the terry thread remains continuous and is not cut. In going on to the heel, the upper rear sinker cam 51 (Figs. 6 and 7) is moved to inoperative position by its control mechanism so that a yarn change of either the terry thread or the body thread may be made. Otherwise the new yarns would come down on the upper level of the sinker. After the yarn change has been made the lower rear cam 53, which has been held out by cam lever 88 (Fig. 14) is released by the nose portion of the cam lever 101 (Fig. 2) riding off of corresponding pattern cam 103 (Fig. 1). Cam 53 is thereupon controlled by the roller 97 (Fig. 2) of bellcrank 95 engaging the cam segment 98 on the beveled gear 23 to move cam 53 in and out as the cylinder reciprocates. The timing of this movement is such that cam 53 is moved into operative position during the forward or clockwise swing of the needle cylinder at the place where the group of middle notched sinkers (Fig. 13) occur and stays in for the balance of the course. As described above the middle notched sinkers are located between the point D and E in Fig. 9. This operation of the sinker cam 53 assures that the body thread and terry thread have had an opportunity to straighten out before the sinkers are moved in to terry position so that proper separation of the thread will be obtained by the curved fingers 39 of the sinkers. On the back swing of the needle cylinder, the front sinker cam 55 is let in to operative position at the point where the top notch sinkers (Fig. 12) occur, i. e., between the points F and G, in Fig. 9. The operation of the sinkers in separating the body thread and terry thread is just the same as on the forward swing of the needle cylinders. As explained above, the inward and outward movement of the front sinker cam 55 is controlled by engagement of roller 109 (Fig. 8) with a segmental cam on the sinker ring. During the knitting of the heel the inner portion 191 and intermediate portion 192 of the composite cam 188 (Figs. 19 and 20) are moved into alignment with the stationary cam portion 189. The slackening of the stitches in the heel portion is achieved by lowering the cam block carrying the stitch cams so as to draw longer stitches. The needles are thereupon drawn down not only further but also earlier. To prevent this change from disturbing the relative movement of the needles and sinkers in separating the body thread and terry thread to produce terry fabric, it is compensated for by shifting the sinker cap by moving the inner end of the finger 214 (Fig. 3) upwardly so as to engage an abutment on the sinker cap. As no wrap embroidery pattern is desired on the heel portion of the sock, the feeding of wrap thread to the needles is interrupted.

During the knitting of the sole portion 6 and the corresponding part of the instep 3 the operation of the machine is the same as during the knitting of the high splice portion. Thus, the terry thread feed finger is moved in and out by the cam 133 (Fig. 1) thereby also operating the cutter and binder 221 (Fig. 4), the upper rear sinker cam 51 (Fig. 7) is moved inwardly to operative position, and the lower cam 53 is withdrawn. The inner end of the finger 214 (Fig. 3) is moved downwardly so that the position of the sinker cap is thereupon controlled by the regular bumper screw. Cam elements 191 and 192 (Fig. 21) are drawn back so that the stitches on the sole side only of the needle cylinder are slackened. The feeding of wrap embroidery thread to selected needles on the instep side of the needle cylinder is resumed so that the wrap embroidery pattern is continued down into the instep. It will be seen from the foregoing description that the production of wrap embroidery non-terry fabric in the instep portion of the article is in no way interfered with by the mechanism for producing terry fabric in the buffer portion, high splice portion, heel or sole of the article. During the knitting of the sole portion, as during the knitting of the buffer portion 12 and the high splice portion 4, each of the succeeding portions is produced partly as terry fabric and partly as wrap embroidery non-terry fabric. However, the coursewise extents of the respective portions is different when knitting the buffer portion than it is when knitting the high splice and sole portions.

Upon going into the toe band 7, the terry thread feed finger is kept continuously in feeding position either by shogging the rock sleeve 131 (Fig. 1) to the left, so that the arm 132 is no longer engaged by cam 133, or if desired by moving another terry thread feed finger into feeding position. The lower rear sinker cam 53 is moved into operative position, being held in by operation of cam 91 (Fig. 14) which engages the nose portion 89 of cam lever 88. The action of cam lever 88 predominates over that of bellcrank 95 (Fig. 2) which tends to move the lower rear cam 53 in and out. This cam lever 88 operates through a positive connection, while the bellcrank 95 is connected with the lower sinker cam 53 through the spring slip-joint 106 described above (col. 11). During the knitting of the toe band the stitches may be slackened throughout the coursewise extent of the fabric by downward movement of the stitch cam block as described in conjunction with the knitting of the heel. The earlier downward movement of the needles resulting from this adjustment of the cam may be compensated for by moving the inner end of the finger 214 (Fig. 3) upwardly to engage an abutment on the sinker cap, and thereby shift the sinker cap forwardly, i. e., in a direction contrary to the direction of rotation of the needle cylinder. The feeding of wrap embroidery thread would ordinarily be discontinued so that no wrap embroidery pattern is formed in the toe band.

The operation of the machine in knitting the toe portion 8 is the same as in knitting the heel portion 5. After completing the toe portion it is usually desirable to knit a plurality of plain courses without terry thread to form a looper's edge.

While the operation of the machine has, by way of example, been described in conjunction with the article shown in Fig. 17, it will be understood that, if desired, the buffer heel portion may be omitted, as illustrated in Fig. 16. In this event the steps described above for producing the buffer heel will be omitted and the sequence of operations will proceed from the knitting of the leg portion directly to the knitting of the high-splice and instep portion. It will also be understood that other variations are possible by suitable variation of the pattern cams controlling operation of the machine.

In the above description it was pointed out that during the knitting of the upper portion 12 and also during the knitting of the high splice portion 4 and sole portion 6 certain of the needles are concurrently being operated to produce wrap embroidery fabric. Moreover, in tracing the operation of the machine it will be seen that needles of the same group must be capable of producing both wrap embroidery fabric and terry fabric. Considering, for example, the group of needles located between points C and H (Fig. 9) i. e., a group corresponding to the coursewise extent of the buffer portion 12, it will be seen that during the knitting of the leg portion these needles are operated to produce wrap embroidery non-terry fabric, while during the knitting of the buffer portion 12, heel portion 5, sole portion 6, toe band portion 7, and toe portion 8, the same needles produce terry fabric. The two groups of needles between points B and C and between points H and A in Fig. 9 produce wrap embroidery non-terry fabric during the knitting of the leg portion and also during the knitting of the buffer portion 12, but produce terry fabric during the knitting of the high splice portion 5, sole portion 6, toe band portion 7 and toe portion 8. The needles located between the points A and B (Fig. 9) produce wrap embroidery fabric throughout the knitting of the leg and instep portions of the sock, but produce terry fabric during the knitting of the toe band portion 7. As indicated at 17 in Fig. 17 and at 11 in Fig. 16 the wrap embroidery pattern may, if desired, be extended into the terry portions of the article.

What we claim and desire to secure by Letters Patent is:

1. In an article of seamless hosiery, the combination of heel, sole, toe and high splice portions comprising body thread and terry thread knit to form terry looped fabric, and an integral leg portion comprising body thread and wrap thread knit in plating relation at selected stitches to provide a wrap embroidery pattern in said leg portion, the wrap thread extending in a general walewise direction into the high splice portion and being knit at selected stitches in plating relation with the body thread and terry thread to form a continuation of said pattern in said high splice portion.

2. In an article of seamless hosiery, the combination of heel, sole and toe portions comprising body thread and terry thread knit to form terry fabric in said portions, integral leg and instep portions comprising body thread and wrap thread knit in plating relation to provide a wrap embroidery pattern in said leg and instep portions, and a high splice portion comprising body thread and terry thread knit to form terry fabric, and wrap thread knit at selected stitches in plating relation with said body thread and terry thread to provide a wrap embroidery pattern in said high splice portion.

3. In an article of hosiery, the combination of heel, sole and toe portions, comprising body thread and terry thread knit to form terry loops on the inner face of said portions, said body thread being knit in plating relation with said terry thread to form the outer face of said fabric, a leg portion comprising body thread and wrap thread knit in plating relation over said body thread to form a wrap embroidery pattern, and a high splice portion comprising body thread and terry thread knit to form terry fabric with terry loops on the inner face and body thread on the outer face of the fabric, and wrap thread knit at selected stitches in plating relation over body said terry thread and body thread to form a wrap embroidery pattern in said high splice portion.

4. In an article of seamless hosiery, the combination of integral high splice, heel, sole and toe portions formed of plain knit fabric comprising a body thread and terry thread knit to form terry loops on the inner face of said fabric, and an integral leg portion and instep portion formed of plain knit fabric comprising body thread and wrap thread knit in plating relation over said body thread at selected wales to form a wrap embroidery pattern on the outer face of said fabric, said wrap thread and pattern extending downwardly in a general walewise direction beyond the course at which said terry fabric high splice portion begins.

5. In an article of hosiery, the combination of a tubular seamless section comprising a plurality a tubular seamless section comprising a plurality of courses of thread plain knit with loops of uniform length throughout the circumferential extent thereof to form a leg portion of said article, an integral tubular seamless section comprising a plurality of courses of thread plain knit with loops of uniform length throughout a portion of the circumferential extent thereof to form an instep portion of said article and knit of body thread and terry thread with loops of unequal length throughout the remainder of said circumferential extent to form a high splice portion and sole portion of terry fabric, a further tubular seamless knit section comprising a plurality of courses knit throughout the circumferential extent thereof of body thread and terry thread with loops of unequal length to form an annular toe band portion of terry fabric having terry loops on the inner face of the fabric, and wrap thread knit in plating relation at selected stitches of the fabric to form a wrap embroidery pattern on the outer face of the fabric, said wrap thread and resulting pattern running in a general walewise direction down the leg portion and extending beyond the beginning of said terry high splice portion.

6. In an article of hosiery, the combination of heel, sole and toe portions formed of terry fabric, integral leg and instep portions formed of plain knit, non-terry fabric, a buffer portion of terry fabric extending upwardly above said heel portion, said buffer portion being of less width than said heel portion in a direction coursewise of the fabric, and said leg portion comprising body thread and wrap thread knit in plating relation over said body thread at selected stitches to form a wrap embroidery pattern running in a general walewise direction down said leg portion and extending downwardly beyond the upper extent of said buffer portion and within the coursewise extent of said heel portion.

7. In an article of hosiery, the combination of high splice, heel, sole and toe portions comprising body thread and terry thread knit to form terry fabric in said portions, a buffer portion of terry fabric extending upwardly above said high splice portion, said buffer portion being of less width than said high splice portion in a direction coursewise of the fabric, and integral leg and instep portions comprising body thread and wrap thread knit in plating relation over said body thread at selected stitches to provide a wrap embroidery pattern, said wrap thread extending in a general walewise direction into the high splice portion and being knit in plating relation with the body thread and terry thread at selected stitches to form a continuation of said pattern in said high splice portion.

8. In an article of hosiery, the combination of high splice, heel and toe portions comprising body thread and terry thread knit to form terry fabric in said portions, a buffer portion of terry fabric extending upwardly above said high splice portion, said buffer portion being of less width than said high splice in a direction coursewise of the fabric, and integral leg and instep portions comprising body thread and a plurality of wrap threads knit in plating relation over said body thread at selected stitches to provide a wrap embroidery pattern, certain of said wrap threads extending in a general walewise direction into the high splice portions and being knit in plating relation with the body thread, and wrap thread at selected stitches to form a continuation of a portion of said pattern, and other of said wrap threads being terminated at the beginning of said high splice portion.

9. In an article of hosiery, the combination of high splice, heel, sole and toe portions formed of terry fabric, a buffer portion of terry fabric extending upwardly above said high splice portion, said buffer portion being of less width than said high splice in a direction coursewise of the fabric, and integral leg and instep portions of non-terry fabric, said leg portion comprising body thread and a plurality of wrap threads knit in plating relation over said body thread at groups of selected stitches to form wrap embroidery designs extending across a plurality of consecutive wales and running down said leg portion in a generally walewise direction, certain of said designs extending downwardly beyond the upper extent of said buffer portion and within the coursewise extent of said high splice portion.

10. In a knitted article of plain knit hosiery, a section of plain knit fabric comprising body thread and terry thread knit together, said terry thread only being knit to form terry loops on the inner face of the fabric, and a plurality of wrap embroidery threads extending in a generally walewise direction and knit in plating relation over both the terry thread and the body thread at selected stitches, including stitches at which said terry loops occur, to form a wrap embroidery pattern on the outer face of said terry fabric.

11. In an article of seamless hosiery, the combination of thread knit to form heel, sole, toeband and toe portions of plain knit fabric having terry loops on the inner face of said portions, said terry heel and toe portions being reciprocatorily knit, and leg and instep portions of plain knit non-terry fabric and wrap embroidery thread knit in plating relation over said aforementioned thread to form a wrap embroidery pattern on the outer face of selected portions of the fabric, each of selected wales and each of selected courses containing both terry loops on the inner face and wrap embroidery thread on the outer face of the fabric.

12. In an article of seamless hosiery, the combination of thread knit to form heel, sole, and toe portions of plain knit fabric having terry loops on the inner face of said portions, said terry heel and toe portions being reciprocatorily knit, and leg and instep portions of plain knit non-terry fabric and wrap embroidery thread knit in plating relation over said aforementioned thread to form a wrap embroidery pattern on the outer face of selected portions of the fabric, consecutive ones of selected wales and consecutive ones of selected courses containing both terry loops on the inner face and wrap embroidery thread on the outer face of the fabric.

13. In an article of seamless hosiery, the combination of reciprocatorily knit heel and toe portions formed of plain knit fabric comprising a body thread and terry thread knit to form terry loops on the inner face of said fabric, and an integral leg portion and instep portion formed of plain knit fabric comprising body thread and wrap thread knit in plating relation over said body thread at selected wales to form a wrap embroidery pattern on the outer face of said fabric, said wrap thread and pattern extending downwardly of the leg in a general walewise direction beyond the course at which said terry fabric portion begins.

PAUL L. THURSTON.
HARRISON F. HILKER.
HAROLD WELKER.

REFERENCES CITED

The following references are of record in the file of this patent:

UNITED STATES PATENTS

| Number | Name | Date |
|---|---|---|
| 2,143,630 | Nebel | Jan. 10, 1939 |
| 2,144,563 | Davis | Jan. 17, 1939 |
| 2,200,207 | Page et al. | May 7, 1940 |
| 2,241,901 | Davis | May 13, 1941 |
| 2,283,995 | Hutton et al. | May 26, 1942 |
| 2,289,052 | Seligman | July 7, 1942 |
| 2,361,280 | Fregeolle | Oct. 24, 1944 |
| 2,366,124 | Page et al. | Dec. 26, 1944 |
| 2,375,683 | Page | May 8, 1945 |
| 2,375,684 | Page | May 8, 1945 |